United States Patent
Powers

(10) Patent No.: US 8,827,197 B2
(45) Date of Patent: Sep. 9, 2014

(54) APPARATUS AND METHOD FOR INTERLEAVING POLYMERIC ROLL FOR GAS IMPREGNATION AND SOLID-STATE FOAM PROCESSING

(75) Inventor: Steven Ray Powers, Everett, WA (US)

(73) Assignee: MicroGREEN Polymers Inc, Arlington, WA (US)

( * ) Notice: Subject to any disclaimer, the term of this patent is extended or adjusted under 35 U.S.C. 154(b) by 1305 days.

(21) Appl. No.: 12/612,652

(22) Filed: Nov. 4, 2009

(65) Prior Publication Data
US 2010/0112301 A1 May 6, 2010

Related U.S. Application Data

(60) Provisional application No. 61/111,298, filed on Nov. 4, 2008.

(51) Int. Cl.
| | |
|---|---|
| *B65H 18/08* | (2006.01) |
| *B32B 37/00* | (2006.01) |
| *B65H 39/16* | (2006.01) |
| *B32B 1/08* | (2006.01) |
| *B32B 27/12* | (2006.01) |
| *B29C 44/34* | (2006.01) |

(52) U.S. Cl.
CPC ........ *B65H 39/16* (2013.01); *B65H 2301/3251* (2013.01); *B32B 37/00* (2013.01); *B65H 2401/113* (2013.01); *B65H 2701/1752* (2013.01); *B32B 1/08* (2013.01); *B65H 2401/242* (2013.01); *B29C 44/348* (2013.01); *B29C 44/3453* (2013.01); *B32B 27/12* (2013.01); *B29C 44/3446* (2013.01)
USPC ........................................ 242/530.2; 242/412

(58) Field of Classification Search
USPC .............................. 242/530, 530.1, 530.2, 412
See application file for complete search history.

(56) References Cited

U.S. PATENT DOCUMENTS

| | | | | |
|---|---|---|---|---|
| 1,948,568 | A | | 2/1934 | Faber |
| 2,224,997 | A | * | 12/1940 | Weisse ........................ 242/530.2 |

(Continued)

FOREIGN PATENT DOCUMENTS

| | | |
|---|---|---|
| EP | 0371392 | 6/1990 |
| EP | 1055499 A1 | 11/2000 |

(Continued)

OTHER PUBLICATIONS

Wang, "Solvent-free Fabrication of Porous Polymer for Tissue Engineering Applications," University of Washington, Dept. of Mechanical Engineering (dissertation), 2007.

(Continued)

*Primary Examiner* — William A Rivera
(74) *Attorney, Agent, or Firm* — John M Janeway; Janeway Patent Law PLLC

(57) ABSTRACT

The present invention relates to apparatuses and methods for making interleaved cylindrical rolls from a polymer roll and a porous roll. The interleaved rolls disclosed herein are useful for subsequent high pressure gas impregnation and solid-state foam processing. In one embodiment, an interleaving apparatus comprises: a first rotatable platform for unwinding a first cylindrical roll of a first sheet material, the first rotatable platform being rotatable about a first central axis; a second rotatable platform for unwinding a second cylindrical roll of a second sheet material, the second rotatable platform being rotatable about a second central axis; and a third rotatable platform for winding, while the first and second materials are unwinding, the first sheet material together with the second sheet material to yield the interleaved cylindrical roll, the third rotatable platform being rotatable about a third axis and proximate to the first and second rotatable platforms.

7 Claims, 4 Drawing Sheets

(56) References Cited

U.S. PATENT DOCUMENTS

| | | | |
|---|---|---|---|
| 2,317,448 A | | 4/1943 | Dreyfus |
| 2,629,312 A | | 2/1953 | Davis |
| 2,755,029 A | * | 7/1956 | Speed et al. ............... 242/530.1 |
| 3,244,537 A | | 4/1966 | Cease |
| 3,364,519 A | | 1/1968 | Pitsch |
| 3,610,000 A | | 10/1971 | Lopata |
| 3,744,402 A | | 7/1973 | Piegza |
| 3,845,915 A | * | 11/1974 | Schmidt et al. ............... 242/530 |
| 3,846,526 A | | 11/1974 | Wade |
| 3,883,625 A | | 5/1975 | Thomas |
| 3,895,911 A | | 7/1975 | Prins |
| 3,923,556 A | * | 12/1975 | Iszczukiewicz ........... 242/530.2 |
| 3,937,777 A | | 2/1976 | Wienand |
| 3,955,482 A | | 5/1976 | Moen |
| 4,003,302 A | | 1/1977 | Mencacci |
| 4,074,941 A | | 2/1978 | Jablonski |
| 4,284,596 A | | 8/1981 | Inokuchi |
| 4,304,747 A | | 12/1981 | Lake |
| 4,386,188 A | | 5/1983 | Grancio |
| 4,424,287 A | | 1/1984 | Johnson |
| 4,473,665 A | | 9/1984 | Martini-Vvedensky et al. |
| D277,632 S | | 2/1985 | Staufenberg |
| 4,608,009 A | | 8/1986 | Whiteside |
| 4,693,856 A | | 9/1987 | Rubens |
| 4,756,091 A | | 7/1988 | Van Denend |
| 4,761,256 A | | 8/1988 | Hardenbrook |
| 4,848,543 A | | 7/1989 | Doboze |
| 4,911,869 A | | 3/1990 | Meyer |
| 4,981,631 A | | 1/1991 | Cheung |
| 5,128,202 A | | 7/1992 | Subramanian |
| 5,158,986 A | | 10/1992 | Cha |
| 5,172,443 A | | 12/1992 | Christ |
| 5,182,307 A | | 1/1993 | Kumar |
| 5,207,008 A | | 5/1993 | Wimburger |
| 5,217,660 A | | 6/1993 | Howard |
| 5,223,545 A | | 6/1993 | Kumar |
| 5,303,484 A | | 4/1994 | Hagen |
| 5,334,356 A | | 8/1994 | Baldwin |
| 5,362,436 A | | 11/1994 | Wagner |
| 5,364,696 A | | 11/1994 | Wagner |
| 5,369,135 A | | 11/1994 | Campbell |
| 5,437,846 A | | 8/1995 | Roumagnac |
| 5,640,784 A | | 6/1997 | Rocheleau |
| 5,684,055 A | | 11/1997 | Kumar et al. |
| 5,723,510 A | | 3/1998 | Kabumoto et al. |
| 5,747,085 A | | 5/1998 | Veltman |
| 5,835,657 A | | 11/1998 | Suarez |
| 5,844,731 A | | 12/1998 | Kabumoto |
| 5,867,920 A | | 2/1999 | Rogne |
| 5,904,946 A | | 5/1999 | Kemp |
| 5,955,014 A | | 9/1999 | Raukola |
| 6,012,583 A | | 1/2000 | Ramirez |
| 6,102,313 A | * | 8/2000 | Salzsauler et al. ......... 242/160.4 |
| D476,861 S | | 7/2003 | Zettle |
| 6,656,671 B1 | | 12/2003 | Aylward |
| 6,884,823 B1 | | 4/2005 | Pierick |
| 6,948,378 B2 | | 9/2005 | Solberg et al. |
| 7,083,849 B1 | | 8/2006 | Albrecht |
| 7,501,175 B2 | | 3/2009 | Branch et al. |
| 7,585,439 B2 | | 9/2009 | Branch et al. |
| 7,807,260 B2 | | 10/2010 | Nadella et al. |
| 2001/0032903 A1 | | 10/2001 | Durrance |
| 2002/0168509 A1 | | 11/2002 | Desimone |
| 2003/0130364 A1 | | 7/2003 | Vo |
| 2005/0035495 A1 | | 2/2005 | Baker |
| 2005/0058824 A1 | | 3/2005 | Fujimoto |
| 2005/0181196 A1 | | 8/2005 | Aylward |
| 2005/0203198 A1 | | 9/2005 | Branch et al. |
| 2006/0073298 A1 | | 4/2006 | Hutchinson |
| 2006/0284331 A1 | | 12/2006 | Branch |
| 2008/0274346 A1 | | 11/2008 | Miller |
| 2008/0277817 A1 | | 11/2008 | Miller |
| 2008/0280123 A1 | | 11/2008 | Miller |
| 2009/0065136 A1 | | 3/2009 | Nadella |
| 2009/0104420 A1 | | 4/2009 | Nadella et al. |
| 2010/0062235 A1 | | 3/2010 | Nadella |
| 2010/0112301 A1 | | 5/2010 | Powers |
| 2011/0000948 A1 | | 1/2011 | Fuwa |
| 2011/0081524 A1 | | 4/2011 | Nadella |
| 2012/0037742 A1 | * | 2/2012 | Michal et al. ............... 242/160.4 |
| 2012/0267814 A1 | | 10/2012 | Branch |

FOREIGN PATENT DOCUMENTS

| | | |
|---|---|---|
| EP | 1636008 A2 | 12/2004 |
| JP | 11-170288 | 6/1999 |
| WO | WO 01-36521 A2 | 5/2001 |
| WO | WO2004010472 | 2/2004 |
| WO | WO2004103675 | 2/2004 |
| WO | WO 2012/074979 A1 | 6/2012 |

OTHER PUBLICATIONS

Kumar, "A model for the unfoamed skin on microcellular foams", 1994, Polymer Engineering & Science 34(3) pp. 169-173.

Holl "A steady-state mass balance model of the polycarbonate CO2 System", 2001, Journal of Polymer Science Part B, vol. 39 p. 868-880.

Kumar, "A process for making thermoplastic parts", 1990, 30(20), Polymer Engineering and Science, Oct. 1990, p. 1323-1329.

Kumar, "Semi-continuous production of solid state PET foams," Society of Plastics Engineers Conference Proceedings, 1995, vol. 11, pp. 2189-2192.

Holl "An in situ study of plasticization of polymers by high-pressure gases", 1998, Journal of Polymer Science Part A: polymer chemistry 36(6) p. 977-982.

International Search Report for PCT/US2014/011534 dated May 12, 2014.

* cited by examiner

APPARATUS AND METHOD FOR INTERLEAVING POLYMERIC ROLL FOR GAS IMPREGNATION AND SOLID-STATE FOAM PROCESSING

CROSS-REFERENCE TO RELATED APPLICATIONS

This application claims the benefit of U.S. Provisional Application No. 61/111,298 filed on Nov. 4, 2008, which application is incorporated herein by reference in its entirety for all purposes.

TECHNICAL FIELD

The present invention relates generally to apparatuses and methods for making interleaved cylindrical rolls from a polymer film roll (solid or previously foamed) and a porous gas permeable material roll. The interleaved cylindrical rolls made in accordance with the present invention are useful for subsequent high pressure gas impregnation and solid-state microcellular foam processing.

BACKGROUND OF THE INVENTION

Microcellular plastic foam refers to a polymer that has been specially foamed so as to create micro-pores or cells (also sometime referred to as bubbles). The common definition includes foams having an average cell size on the order of 10 microns in diameter, and typically ranging from about 0.1 to about 250 microns in diameter. In comparison, conventional plastic foams typically have an average cell diameter ranging from about 250 to 500 microns. Because the cells of microcellular plastic foams are so small, to the casual observer these specialty foams generally retain the appearance of a solid plastic.

Microcellular plastic foams can be used in many applications such as, for example, insulation, packaging, structures, and filters (D. Klempner and K. C. Fritsch, eds., *Handbook of Polymeric Foams and Foam Technology*, Hanser Publishers, Munich (1991)). Microcellular plastic foams have many unique characteristics. Specifically, they offer superior mechanical, electrical, and thermal properties at reduced material weights and costs.

The process of making microcellular plastic foams has been developed based on a thermodynamic instability causing cell nucleation (J. E. Martini, S M Thesis, Department of Mech. Eng., MIT, Cambridge, Mass. (1981)). First, a polymer is saturated with a volatile foaming agent at a high pressure. Then, by means of a rapid pressure drop, the solubility of foaming agent impregnated within the polymer is decreased, and the polymer becomes supersaturated. The system is heated to soften the polymer matrix and a large number of cells are nucleated. The foaming agent diffuses both outwards and into a large number of small cells. Stated somewhat differently, microcellular plastic foam may be produced by saturating a polymer with a gas or supercritical fluid and using a thermodynamic instability, typically a rapid pressure drop, to generate billions of cells per cubic centimeter (i.e., bubble density of greater than $10^8$ cells per cubic centimeter) within the polymer matrix.

U.S. Pat. No. 5,684,055 to Kumar et al. (issued Nov. 4, 1997) discloses a method for the semi-continuous production of microcellular foam articles. In a preferred embodiment, a roll of polymer sheet is interleaved with a gas channeling means (e.g., porous paper, gauze, mesh, woven and non-woven fabrics) to yield an interleaved cylindrical roll. The interleaved roll is exposed to a non-reacting gas at elevated pressure for a period of time sufficient to achieve a desired concentration of gas within the polymer. The saturated polymer sheet is then separated from the gas channeling means and bubble nucleation and growth is initiated by heating the polymer sheet. After foaming, bubble nucleation and growth is quenched by cooling the foamed polymer sheet. The '055 patent to Kumar, however, is silent with respect to how the solid polymer sheet and gas channeling sheet are to be interleaved together, especially with regards to industrial scale applications and larger diameter interleaved rolls. In all instances, the '055 patent to Kumar teaches only horizontally-oriented interleaving methods.

Although much progress has been made with respect to the development of microcellular foamed thermoplastic material objects and articles of manufacture, there is still a need in the art for new and improved apparatuses and methods for making interleaved cylindrical rolls suitable for industrial scale high pressure gas impregnation and solid-state foaming operations. The present invention fulfills these needs and provides for further related advantages.

SUMMARY OF THE INVENTION

In brief, the present invention in one embodiment is directed town interleaving apparatus for making an interleaved cylindrical roll. The inventive interleaving apparatus comprises: a first rotatable platform for unwinding a first cylindrical roll of a first sheet material, the first rotatable platform being rotatable about a first variably-oriented central axis; a second rotatable platform for unwinding a second cylindrical roll of a second sheet material, the second rotatable platform being rotatable about a second variably-oriented central axis; and a third rotatable platform for winding, while the first and second materials are unwinding, the first sheet material together with the second sheet material (under zero or near zero tension) to yield the interleaved cylindrical roll, the third rotatable platform being rotatable about a third vertically-oriented axis and proximate to the first and second rotatable platforms. In preferred embodiments, the first and second cylindrical rolls are movable back and forth along respective first and second variably-oriented central axes (which axes can be adjusted between vertical and horizontal, as well as various tilted orientations).

In another embodiment, the present invention is directed to a method for making an interleaved cylindrical roll. The inventive method comprises at least the steps of: unwinding a first cylindrical roll of a first polymer film material (solid or previously foamed); unwinding a second cylindrical roll of a second porous gas permeable sheet material; and interleaving together (preferably in a vertical orientation) the first polymer film material with the second porous gas permeable sheet material under zero or near tension, while the first and second sheet materials are unwinding, to yield the interleaved cylindrical roll.

In yet another embodiment, the present invention is directed to an interleaved cylindrical roll, comprising: a first polymer film (solid or previously foamed) evenly wound about a central axis defining a first Archimedean spiral having a plurality of first spiral turns; and a second porous gas permeable material sheet evenly wound about the central axis and interleaved with the first polymer film thereby defining a second Archimedean spiral having a plurality of second spiral turns. The interleaved cylindrical roll may be characterized in that the spacing between each of the plurality of first and second turns is essentially constant across all diameters of the interleaved cylindrical roll (meaning that the wound second porous gas permeable material sheet remains substantially uncompressed across all diameters of the interleaved cylindrical roll).

These and other aspects of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

In the drawings like reference numerals are generally used to designate like features throughout the several views of the drawings.

DETAILED DESCRIPTION OF THE INVENTION

The present invention relates to apparatuses and methods for making an interleaved cylindrical roll from a polymer roll (solid or previously foamed) and a porous gas-permeable material roll. The interleaved rolls made in accordance with the present invention are useful for subsequent high pressure gas impregnation and solid-state microcellular foam processing because, in large part, they allow for even and uniform gas impregnation across the length and width (i.e., throughout the volume) of the interleaved roll. The apparatuses and methods disclosed herein are amenable to wound polymeric rolls of all commercially available widths and thicknesses.

In the several embodiments disclosed herein, the various interleaving operations are generally described in the context of winding a first polymer film or sheet together with a second porous and gas permeable material sheet to yield an interleaved cylindrical roll (which roll can subsequently be placed in a pressure vessel and uniformly impregnated with a plasticizing gas such as, for example, carbon dioxide ($CO_2$) across the length and width of the roll). The first polymer film or sheet preferably includes PET (polyethylene terephthalate), PETG (polyethylene terephthalate glycol), PLA (polyactide), PC (polycarbonate), TPU (thermoplastic urethane), PMMA (polymethyl methacrylate), polystyrene (PS), PVC (polyvinyl chloride), ABS (acrylonitrile butadiene styrene), PBT (polybutylene terephthalate), PEN (polyethylene napthalate), PEI (polyether imide), PEMA (poly ethyl methacrylate), PPS (polyphenylene sulfide), PI (polyimide), COC (cyclic olefin copolymer), as well as various polymeric blends thereof. Moreover, and as appreciated by those skilled in the art, PET is understood to be inclusive of both RPET (recycled polyethylene terephthalate) and CPET (crystallizing polyethylene terephthalate). The second porous gas permeable sheet material preferably includes a porous paper (such as, for example, a thin sheet of cellulose), a nonwoven film made of polymeric filaments, or a porous fabric sheet.

Figure 1A:
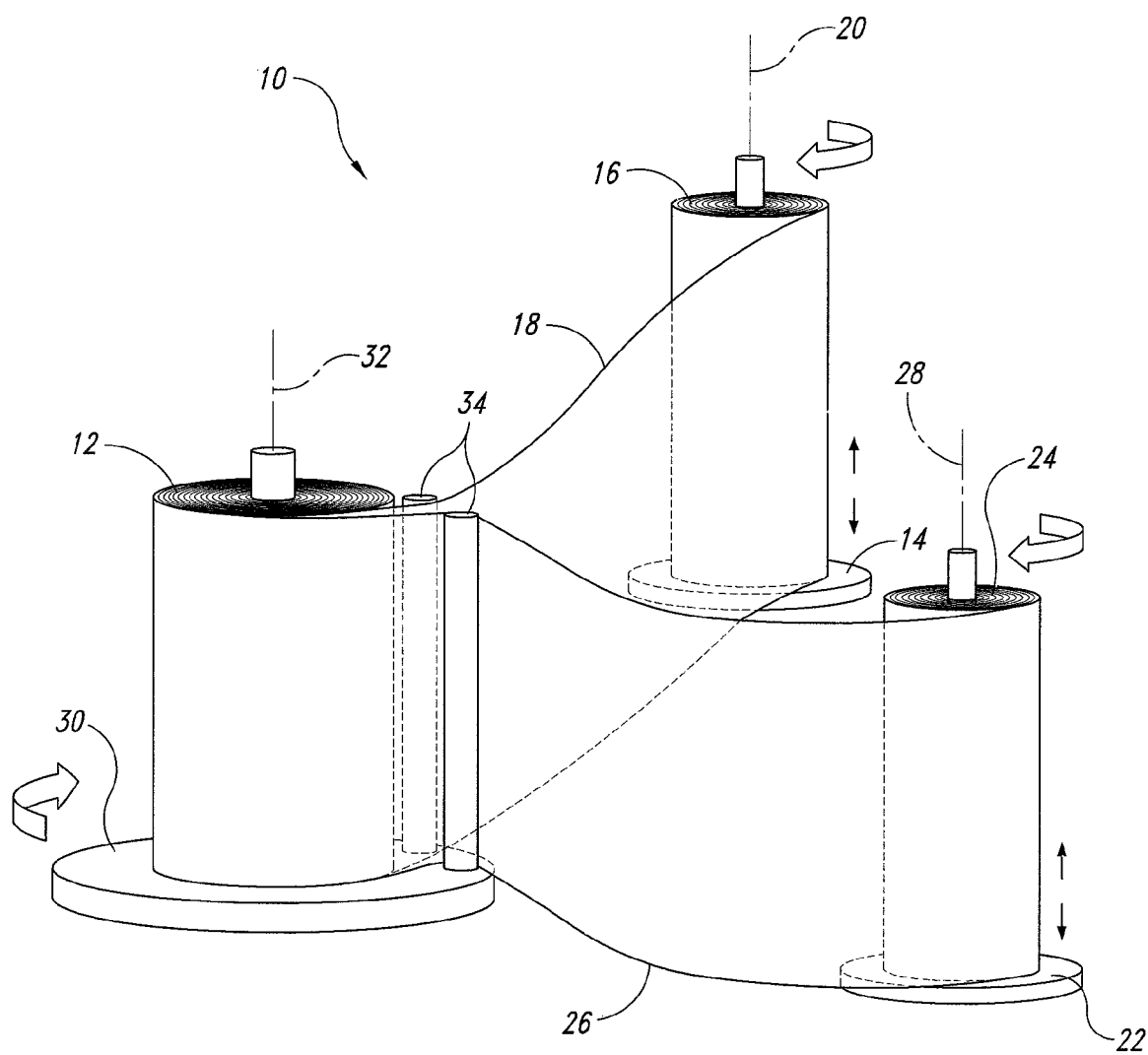
FIG. 1A is a schematic side perspective view of an interleaving apparatus for making a loosely interleaved cylindrical roll in accordance with an embodiment of the present invention (shown with an interleaved cylindrical roll, a polymeric roll, and a porous gas permeable material roll vertically-oriented on respective rotatable platforms for interleafing operations).

With reference to FIG. 1A, the present invention in one embodiment is directed to an interleaving apparatus 10 for making an interleaved cylindrical roll 12. As shown, the inventive interleaving apparatus 10 comprises a first rotatable platform 14 configured for unwinding a first cylindrical roll 16 of a first sheet material 18. The first rotatable platform 14 is rotatable about a first vertically-oriented central axis 20, and is movable up and down (as indicated) to facilitate even edge alignment (in other embodiments, however, edge alignment may be accomplished by use of a plurality of web steering rollers—not shown). The interleaving apparatus 10 also comprises a second rotatable platform 22 that is configured for unwinding a second cylindrical roll 24 of a second sheet material 26. The second rotatable platform 22 is likewise rotatable about a second vertically-oriented central axis 28, and is also movable up and down (as indicated) to also facilitate even interleaving (in other embodiments and as before, edge alignment may be accomplished by use of a plurality of web steering rollers—not shown). As further shown, the interleaving apparatus 10 further comprises a third rotatable platform 30 configured for winding, while the first and second sheet materials 18, 26 are unwinding, the first sheet material 18 together with the second sheet material 26 to yield the interleaved cylindrical roll 12. The third rotatable platform 30 is rotatable about a third vertically-oriented axis 32 and proximate to the first and second rotatable platforms 14, 22. In this configuration, the rate of rotation of the first, second, and third rotatable platforms 14, 22, 30 may be adjusted and coordinated (by computer control—not shown) such that the winding together of the first and second sheet materials 18, 26 occurs under zero or near zero tension (sometimes referred to herein as loosely interleaving).

As further shown in FIG. 1A, the interleaving apparatus 10 also comprises a pair of vertically-oriented powered nip rollers 34 for converging and guiding under zero or near zero tension the first and second sheet materials 18, 26 about the third vertically-oriented axis 32 of the third rotatable platform 30 (with the pair of nip rollers 34 being proximate and adjacent to the third rotatable platform 30). In this configuration, and unlike conventional rolling machinery, the inventive interleaving apparatus 10 is capable of making loosely interleaved cylindrical rolls that are amenable to even and uniform gas impregnation throughout when exposed to a high pressure environment.

Figure 1B:
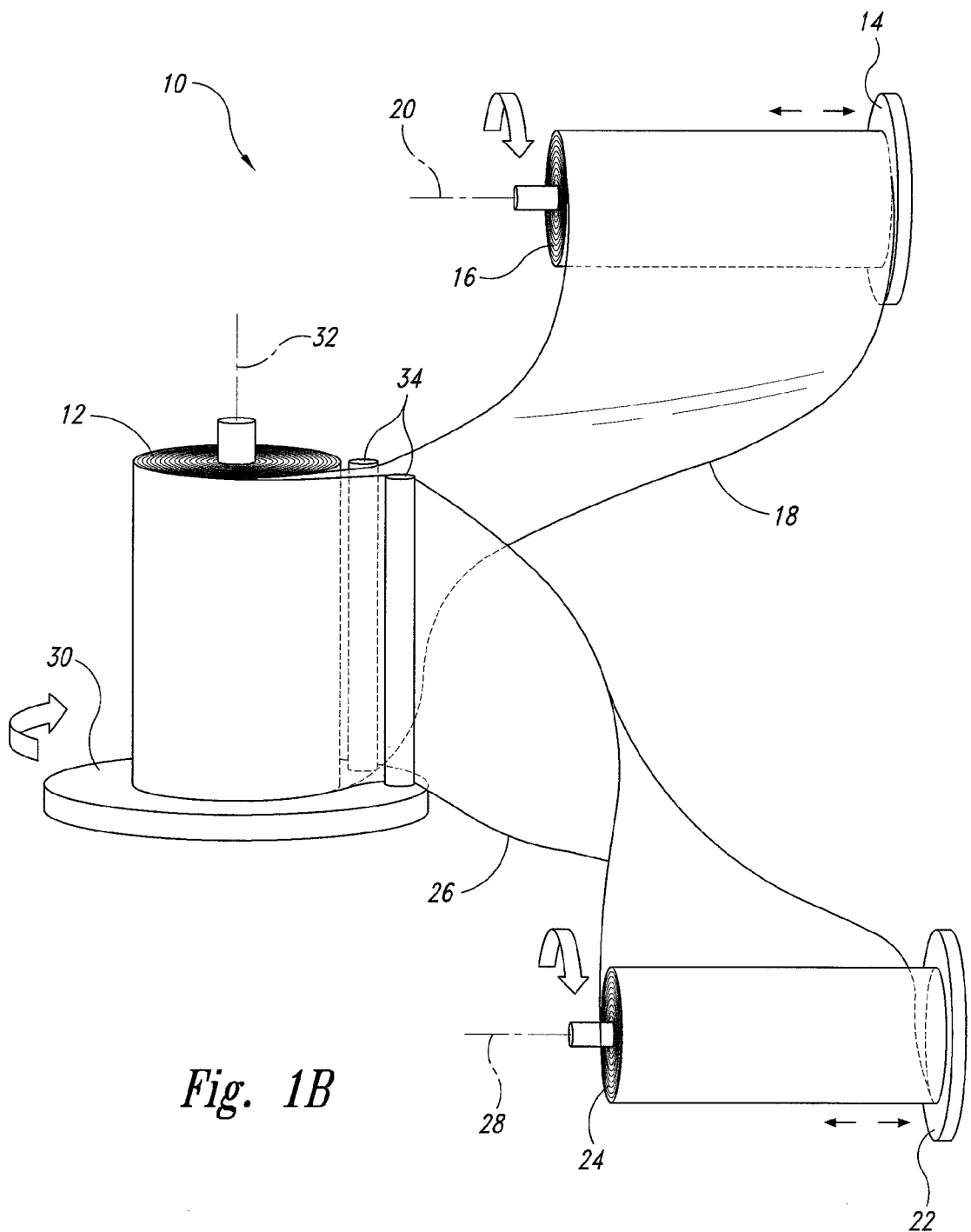
FIG. 1B is a schematic side perspective view of an interleaving apparatus for making a loosely interleaved cylindrical roll in accordance with another embodiment of the present invention (shown with a vertically-oriented interleaved cylindrical roll, and horizontally-oriented polymeric and porous gas permeable material rolls positioned on respective rotatable platforms for interleafing operations).

With reference to FIG. 1B, the present invention in another embodiment is directed to an interleaving apparatus 10 for making an interleaved cylindrical roll 12. As shown in FIG. 1B, this alternative interleaving apparatus 10 comprises essentially the same elements as the interleaving apparatus 10 depicted in FIG. 1A, except that the first and second rotatable platforms 14, 22 and first and second rolls 16, 24 are horizontally-oriented (as opposed to being vertically oriented). In further embodiments, the first and second rotatable platforms 14, 22 and first and second rolls 16, 24 are variably-oriented (meaning that orientation of the respective rotatable platforms and rolls are adjustably positionable between vertical orientations and horizontal orientations, as well as various tilted orientations). In either embodiment, and because the interleaving of the first and second rolls 16, 24 occurs under zero or near zero tension, the resulting interleaved cylindrical roll 12 is considered to be "loosely" interleaved.

Figure 2A:
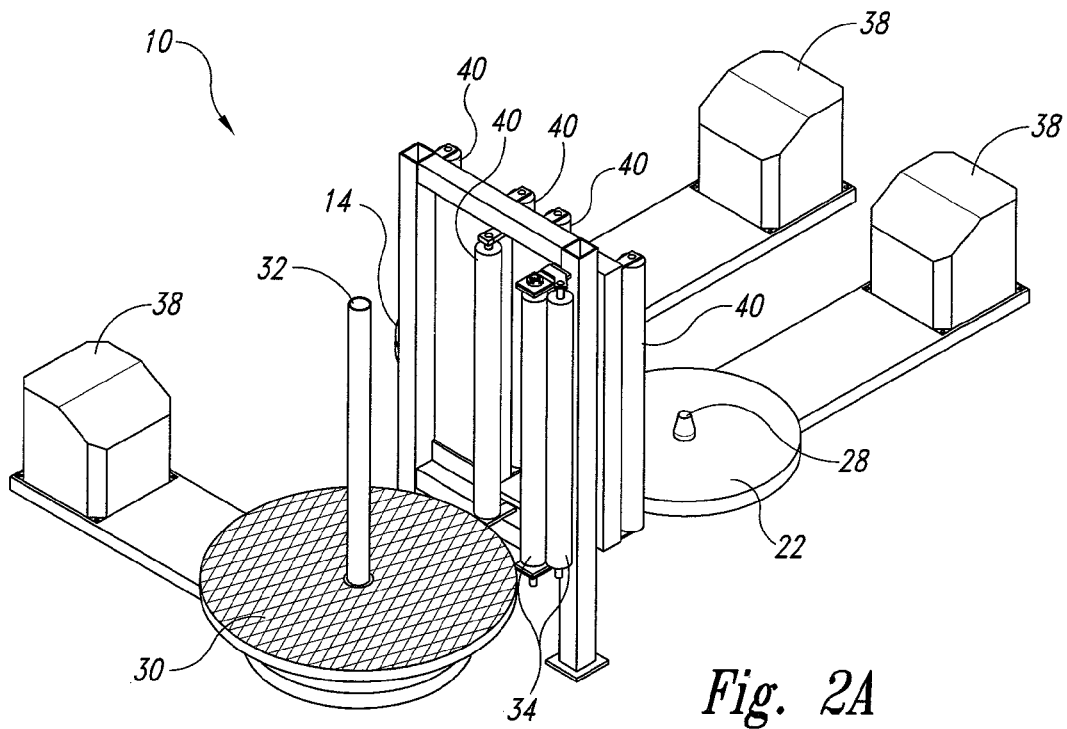
FIG. 2A is schematic elevated side perspective view of another interleaving apparatus for making a loosely interleaved cylindrical roll in accordance with another embodiment of the present invention (shown without any rolls).
Figure 2B:
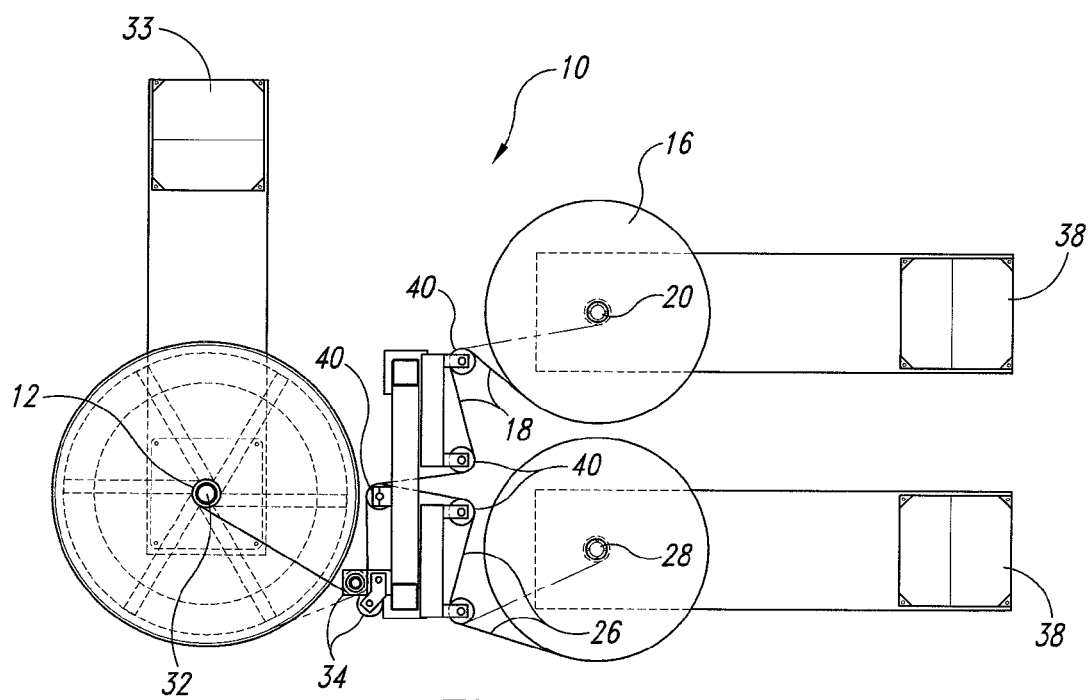
FIG. 2B is a top plan view of the interleaving apparatus of FIG. 2A (but shown with an interleaved cylindrical roll, a polymeric roll, and a porous gas permeable material roll positioned on respective rotatable platforms for interleafing operations).

With reference to FIG. 2A-B, the present invention in yet another embodiment is directed to an interleaving apparatus 10 for making an interleaved cylindrical roll 12. As shown, the inventive interleaving apparatus 10 comprises a first rotatable platform 14 configured for unwinding a first cylindrical roll 16 of a first sheet material 18. The first rotatable platform 14 is rotatable about a first variably-oriented central axis 20. The interleaving apparatus 10 also comprises a second rotatable platform 22 that is configured for unwinding a second cylindrical roll 24 of a second sheet material 26. The second rotatable platform 22 is likewise rotatable about a second variably-oriented central axis 28. As further shown, the interleaving apparatus 10 further comprises a third rotatable platform 30 configured for winding, while the first and second sheet materials 18, 26 are unwinding, the first sheet material 18 together with the second sheet material 26 to yield the interleaved cylindrical roll 12. The third rotatable platform 30 is rotatable about a third vertically-oriented axis 32 and proximate to the first and second rotatable platforms 14, 22. In this configuration, the rate of rotation of the first, second, and third rotatable platforms 14, 22, 30 may be adjusted and coordinated (by computer controlled drive mechanisms 38) such that the winding together of the first and second sheet materials 18, 26 occurs under zero or near zero tension.

As further shown in FIGS. 2A-B, the interleaving apparatus 10 also comprises a pair of vertically-oriented powered nip rollers 34 for converging and guiding under zero or near zero tension the first and second sheet materials 18, 26 about the third vertically-oriented axis 32 of the third rotatable platform 30 (with the pair of nip rollers 34 being proximate and adjacent to the third rotatable platform 30). In addition, and for purposes of facilitating even edge alignment between the first and second cylindrical rolls 16, 24 during interleafing operations the interleaving apparatus 10 also comprises a plurality of web steering rollers 40 for aligning the edges of the first and second sheet materials 18, 26. As shown, the plurality of web steering rollers 40 is proximate and adjacent to the pair of nip rollers 34.

Figure 3A:
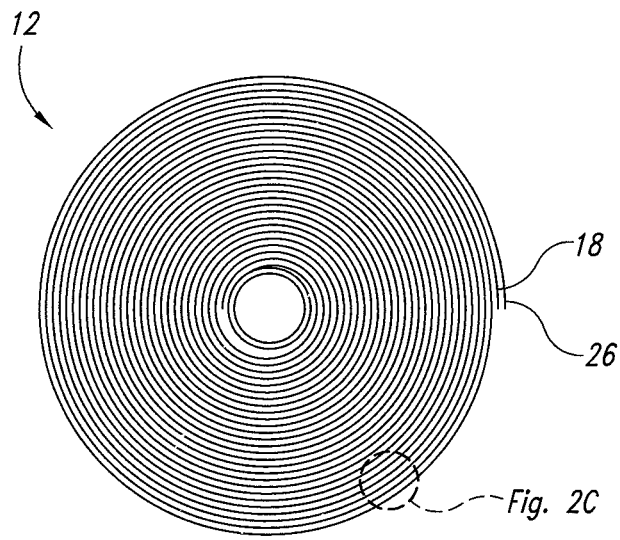
FIG. 3A is an end view of an interleaved cylindrical roll in accordance with an embodiment of the present invention.
Figure 3B:
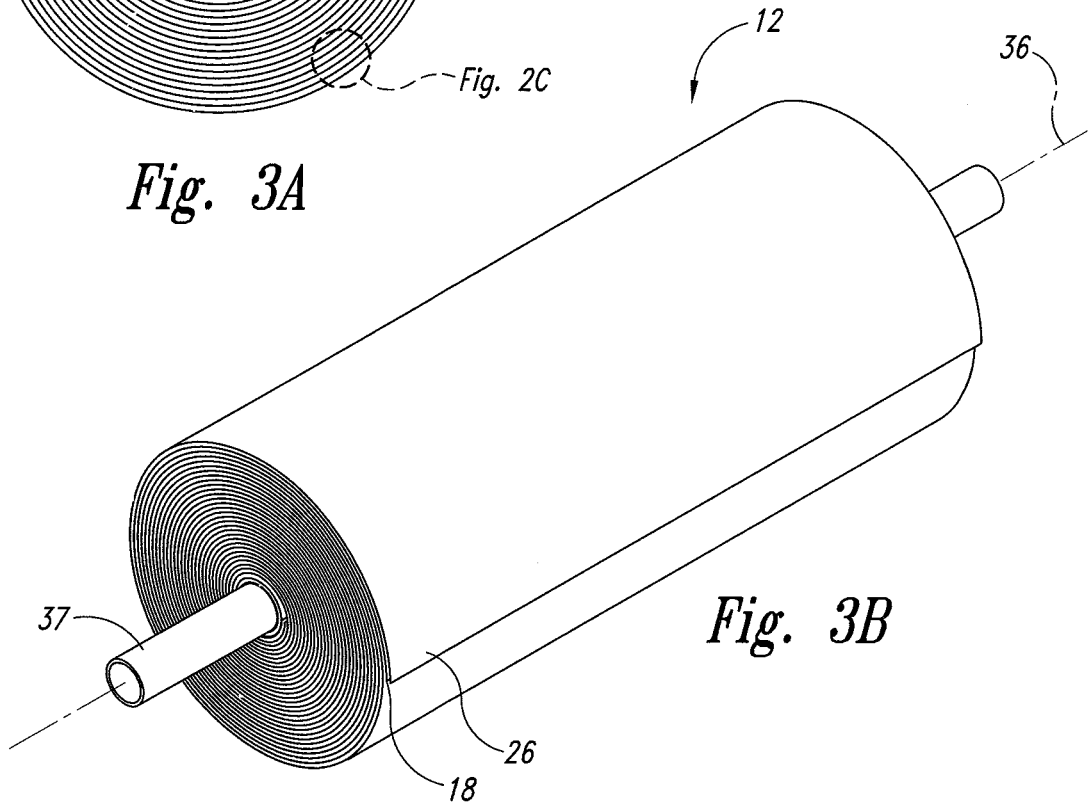
FIG. 3B is a side perspective view of the interleaved cylindrical roll of FIG. 3A.
Figure 3C:
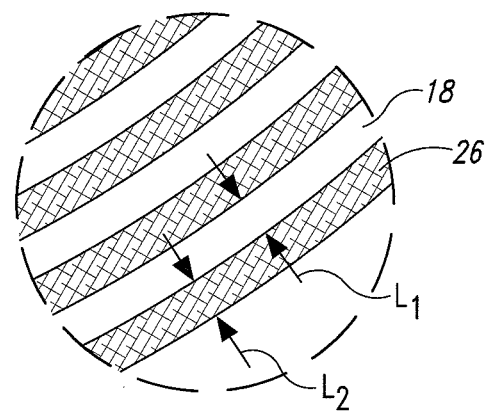
FIG. 3C is an enlarged view of an end portion of the interleaved cylindrical roll of FIG. 3A showing that the first and second sheet materials remain substantially uncompressed (and thus evenly spaced apart) across the roll diameter.

Thus, and in yet another embodiment and with reference to FIGS. 3A-C, the present invention is also directed to an interleaved cylindrical roll 12 that comprises: a first polymer film 18 (having width $L_1$) evenly wound about a first central longitudinal axis 36 (which axis 36 is positioned within a first concentric tubular roll 37) so as to define a first Archimedean spiral having a plurality of first spiral turns; and a second porous gas permeable material sheet 26 (having width $L_2$) evenly wound about the central longitudinal axis 36 (also positioned within the first concentric tubular roll 37) and interleaved with the first polymer film 18 to thereby define a second Archimedean spiral having a plurality of second spiral turns. The interleaved cylindrical roll 12 may be characterized in that the spacing between each of the plurality of first and second turns is essentially constant across all diameters of the interleaved cylindrical roll 12 (meaning that the distance between layers $L_1$ and $L_2$ remains essentially the same across all turns and all possible diameters of the interleaved roll). In some embodiments the first polymer film is uniformly impregnated (and thus partially dilated but not foamed) with a plasticizing gas (such as, for example, $CO_2$), and the plurality of first and second turns is greater than about 25 (roughly equating to an interleaved roll having a diameter of at least 2 inches when the combined thickness of layers $L_1$ and $L_2$ equals about 0.085 inches). In further embodiments the interleaved cylindrical roll 12 has a diameter of at least 12 inches. In still further embodiments the distances denoted by $L_1$ and $L_2$ are about equal to each other (however, $L_1$ may be less than $L_2$ or $L_1$ may be greater than $L_2$). In certain preferred embodiments layer $L_1$ is a PET film having a thickness of about 0.02 inches, whereas layer $L_2$ is thin cellulose sheet having a thickness of about 0.065 inches.

In yet another embodiment, the present invention is directed to a method for making an interleaved cylindrical roll. The inventive method comprises at least the steps of: unwinding a first cylindrical roll of a first polymer film material; unwinding a second cylindrical roll of a second porous gas permeable sheet material; and interleaving together (preferably in a vertical orientation), the first polymer film material with the second porous gas permeable sheet material under zero or near tension, while the first and second sheet materials are unwinding, to yield the interleaved cylindrical roll. In further embodiments, the first and/or second cylindrical rolls are moved up and down (or back and forth) while unwinding (to thereby facilitate even interleaving operations).

Without necessarily prescribing to any particular scientific theory, it is believed that by loosely interleaving the rolls together in the manner taught above, the problems inherent with conventionally wound interleaved rolls are substantially alleviated. In particular, it has been found that the impregnating gas (associated with the pressure chamber) is more readily able to infiltrate, in all directions, the wound porous gas permeable material sheet (because the material sheet remains uncompressed across all diameters of the interleaved roll). As such, the impregnating gas is able to be more evenly and uniformly transported throughout the volume of the interleaved roll (which, in turn, means that gas impregnation into the wound polymer film is substantially more even and uniform).

For purposes of illustration and not limitation, the following example more specifically discloses exemplary method steps and actual experimental results associated with the making and testing of various interleaved rolls made in accordance with the present invention.

EXAMPLE

Solid-polymer films are generally sold in the form of standard cylindrical rolls of varying lengths and widths. The rolls are wound up very tightly to secure them from breakage and telescoping during shipping and handling. From the perspective of the inventor, there are no known commercial sources for obtaining a solid polymer film interleaved together with a porous gas channeling sheet that is suitable for high pressure gas impregnation and solid-state foam processing. On the contrary, known methods for making interleaved rolls were found to be largely ineffective because of problems associated with non-uniform and uneven gas distribution.

In numerous tests conducted by MicroGREEN Polymers, Inc. (Arlington, Wash.), it was found that a conventional tightly wound, interleaved polymer roll presents a major challenge for achieving uniform gas saturation across the width and along the length of the wound solid polymer roll. More specifically, it was found that when conventional horizontally wound rolls were saturated with high pressure gas in a pressure vessel, the outer layers along the length of the roll and outer edges of each layer across the width of the roll (which were exposed to the gas first) begin to absorb gas and expand in volume due to volume dilation. This caused large amounts of compression throughout the roll, thus squeezing the gas-permeable interleaf material so tightly that it lost its porosity and gas channels, effectively cutting off the entry of gas to the central region of the roll. It was also shown that the resulting variations in gas concentration within the roll layers leads to an unevenly saturated thermoplastic product where the exterior layers along the length and outer edges are more highly saturated than the interior layers and central region across the width, respectively.

In order to counteract the compression effect on the conventional interleaved thermoplastic roll, it was discovered that the interleaved roll needs to be wound loosely enough to allow for a required or constant amount of spacing or gap between the polymer layers to accommodate the wound polymeric roll's expansion and maintain effective gas channels during high pressure gas saturation. To determine whether there was a difference in gas concentration profile between a tightly wound and loosely wound interleaved polymer roll, various tests were conducted on interleaved rolls with diameters of about 18" (made from ≈0.020 inch thick PET (polyethylene terephthalate) and ≈0.065 inch thick cellulose sheet material). The test rolls were exposed to 850 psi $CO_2$ gas for 7 hours and then carefully examined. The results clearly showed that uniform gas saturation was obtained with the loosely wound PET rolls, but not with the tightly wound rolls (suggesting that special interleaving methods and interleaved rolls are needed to accommodate the polymer roll expansion, while maintaining effective gas channels during saturation without occluding gas permeation to the middle layers via the porous interleaved medium).

Prior to the present invention, there were no known methods for obtaining a loosely wound interleaved thermoplastic roll suitable for high pressure gas impregnation and subsequent foam processing. When rolled manually in a horizontal position, it was found that the interleaved thermoplastic roll automatically tightened on itself, especially once it exceeded 12" in diameter. It is believed that the interleaved roll begins to automatically tighten due to the weight of the material; that is, as the weight of the roll increases, the top layer becomes more compressed by the increasing weight exerted at the bottom of the roll during horizontal rotation. Use of a mechanical system for winding a roll horizontally with lay-on rolls or a lay-on belt was also found to be ineffective.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. An interleaving apparatus for making an interleaved cylindrical roll, the apparatus comprising:
   a first rotatable platform for unwinding a first cylindrical roll of a first sheet of material, the first rotatable platform being rotatable about a first central axis;
   a second rotatable platform for unwinding a second cylindrical roll of a second sheet of material, the second rotatable platform being rotatable about a second central axis;
   a third rotatable platform for winding, while the first and second sheets of materials are unwinding, the first sheet of material together with the second sheet of material to yield the interleaved cylindrical roll, the third rotatable platform being rotatable about a third, vertically-oriented axis and proximate to the first and second rotatable platforms; and
   wherein the first rotatable platform, the second rotatable platform, and the third rotatable platform, each rotates such that tension is not generated in the first and second sheets of material as the first and second sheets of material travel from their respective first and second cylindrical rolls and are wound onto the interleaved cylindrical roll.

2. The interleaving apparatus according to claim 1 wherein the first cylindrical roll is movable back and forth along the first central axis.

3. The interleaving apparatus according to claim 1 wherein the second cylindrical roll is movable back and forth along the second central axis.

4. The interleaving apparatus according to claim 1 wherein the first rotatable platform and the first central axis are positionable at or between a horizontal orientation and a vertical orientation.

5. The interleaving apparatus according to claim 1 wherein the second rotatable platform and the second central axis are positionable at or between a horizontal orientation and a vertical orientation.

6. The interleaving apparatus according to claim 1, further comprising a pair of nip rollers for guiding the first and second sheets of material about the third vertically-oriented axis of the third rotatable platform, the pair of nip rollers being proximate and adjacent to the third rotatable platform.

7. The interleaving apparatus according to claim 1, further comprising a plurality of web steering rollers for aligning the edges of the first and second sheets of material.

* * * * *